United States Patent [19]

Petry

[11] 4,218,965
[45] Aug. 26, 1980

[54] BEVERAGE BREWER

[75] Inventor: Stanton H. Petry, Arlington Heights, Ill.

[73] Assignee: Cory Food Services, Inc., Chicago, Ill.

[21] Appl. No.: 31,054

[22] Filed: Apr. 18, 1979

[51] Int. Cl.$^2$ .................... A47J 31/52; A47J 31/00
[52] U.S. Cl. ...................................................... 99/283
[58] Field of Search ............... 99/280, 281, 282, 283, 99/295, 300, 307, 304, 305, 279

[56] References Cited

U.S. PATENT DOCUMENTS

| | | | |
|---|---|---|---|
| 3,347,149 | 10/1967 | Price | 99/282 |
| 3,423,209 | 1/1969 | Weber | 99/283 |
| 3,793,934 | 2/1974 | Martin | 99/282 |
| 3,981,231 | 9/1976 | Grundy | 99/280 |
| 4,069,750 | 1/1978 | Kemp | 99/280 |

*Primary Examiner*—Robert W. Jenkins

*Attorney, Agent, or Firm*—Wegner, Stellman, McCord, Wiles & Wood

[57] ABSTRACT

A beverage brewer having a base, an upright rear portion, a head carried in cantilevered fashion from the upper end of the upright portion and including a basin for receiving cold brewing water. A mounting member within the hollow rear support portion carries the valve and a timer for controlling the valve. The mounting member defines a one-piece element further having an upper flange secured to the front wall of the upright portion of the cabinet. The flange is connected to the top of the mounting wall portion carrying the timer by a spacer. The timer is secured to the mounting wall portion. The pressurized water supply includes a flow regulator connected through a conduit and a gooseneck opening into the basin. The mounting member is further secured to a pair of inturned side flanges on the upright portion of the cabinet to be spaced below the brewing head and above the base of the cabinet.

9 Claims, 4 Drawing Figures

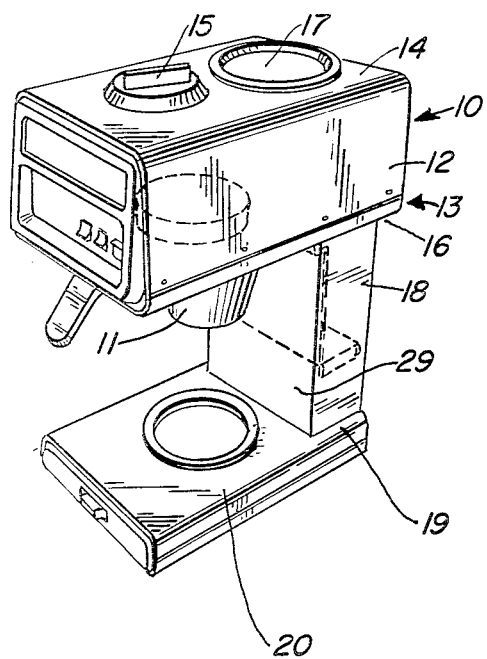
FIG. 1
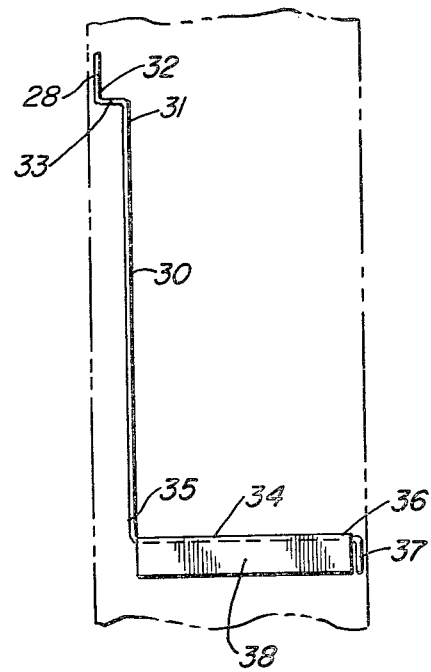
FIG. 2
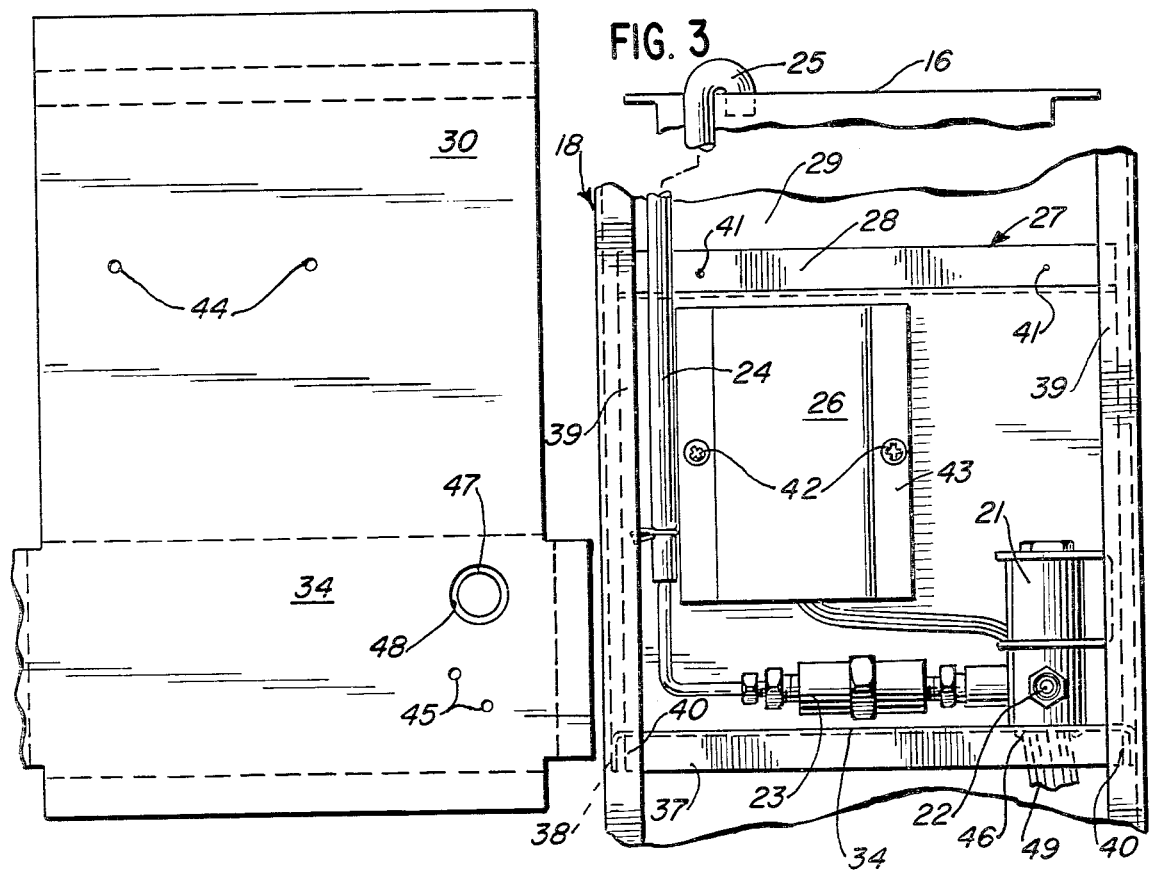
FIG. 4
FIG. 3

BEVERAGE BREWER

BACKGROUND OF THE INVENTION

1. Field of the Invention

This invention relates to beverage brewers and in particular to beverage brewers having an upright portion supporting a head portion of the cabinet in cantilevered fashion from the rear of a base portion of the cabinet. The invention is concerned with means for mounting the elements in the hollow support portion for facilitated manufacture and maintenance.

2. Description of the Prior Art

In one conventional form of beverage brewer, a brewing cartridge is removably installed on the underside of a forwardly cantilevered head portion of a cabinet supported at its rear portion by an upright support portion of the cabinet which, in turn, is mounted to the rear portion of a base portion of the cabinet. The cartridge receives hot brewing water from suitable mechanism within the head which may include a basin for receiving cold brewing water and delivering it to suitable heating means therein.

In one form of prior art beverage brewer of the cantilevered head type, a pour-in opening is provided in the top wall of the head, permitting the selective delivery of cold brewing water through the pour-in opening into the basin for subsequent heating and delivery to the brewing cartridge. It is also conventional in such prior art cantilevered beverage brewers to provide means for delivering cold water from a pressurized source, such as a city main, and for this purpose, it has been conventional to provide flow control valves in flow control regulators within a portion of the cabinet for controlling the desired delivery of the pressurized cold water to the heating means.

In one improved form of beverage brewer of the prior art, the pressurized cold water is delivered into a basin for flow therefrom to the heating means and the brewing cartridge.

SUMMARY OF THE INVENTION

The present invention comprehends an improved beverage brewer having improved means for mounting the flow control means for controlling the delivery of cold brewing water from a pressurized source to the basin of the brewer which is also adapted to receive selectively cold poured-in brewing water through an opening in the top wall of the head portion of the brewer cabinet. The invention comprehends the provision of a one-piece mounting member disposed within the cabinet upright portion including a flange at the upper end thereof abutting the forward wall of the upright portion. The mounting member further includes an upright mounting wall portion which is spaced rearwardly from the upper flange by a horizontal spacer portion. The mounting member further includes a horizontal lower wall at the lower end of the mounting wall and a lower horizontally extending flange secured to inturned flanges of the cabinet upright portion to secure the mounting member to the cabinet at its opposite sides.

The means for securing the upper flange to the upright portion forward wall preferably extends only rearwardly from the forward wall. The means for securing the timer to the upright mounting wall portion of the mounting member may comprise securing means extending through the upright mounting wall portion so as to be received forwardly thereof and rearwardly of the forward wall of the upright portion of the cabinet.

The flow control means may include a valve mounted to the base portion of the mounting member and flow regulator means mounted to the valve and connected through a suitable conduit to a gooseneck opening into the basin at the rear of the cabinet head portion.

The base portion of the mounting member may define downturned flanges disposed at the opposite sidewalls of the upright portion of the cabinet for rigidifying the mounting member which may be formed of a metal sheet.

The base portion of the mounting member may further define means for guiding electrical wires upwardly through the base wall of the mounting member for permitting connection thereof to the valve and timer of the flow control means.

In the illustrated embodiment, the wire guiding means may comprise an annular member mounted in an opening in the base wall rearwardly of the means securing the valve to the base wall.

Thus, the beverage brewer structure of the present invention is extremely simple and economical of construction while yet providing an improved facilitated manufacture and providing for facilitated maintenance of electrical components of the beverage brewer structure.

BRIEF DESCRIPTION OF THE DRAWING

Other features and advantages of the invention will be apparent from the following description taken in connection with the accompanying drawing wherein:

FIG. 1 is a perspective view of a beverage brewer having mounting means embodying the invention;

FIG. 2 is a side elevation of the mounting member thereof;

FIG. 3 is a fragmentary rear elevation with portions broken away illustrating the use of the mounting member in the beverage brewer structure; and FIG. 4 is a fragmentary plan view of a blank partially formed to define the mounting member.

BRIEF DESCRIPTION OF THE PREFERRED EMBODIMENT

In the exemplary embodiment of the invention as disclosed in the drawing, a beverage brewer generally designated 10 is shown to comprise a brewer for forming a hot beverage, such as coffee, and including a brewing cartridge 11 removably carried on the front portion of a head 12 of a cabinet 13. The top wall 14 of the cabinet is provided with a pour-in opening means 15 for pouring cold brewing water into a basin 16 disposed within the head and arranged to deliver the cold water to an instantaneous-type heater 16 for heating the water and delivering it to the brewing cartridge at brewing temperature. As shown in FIG. 1, the top wall 14 may further be provided with a warmer 17 for maintaining the desired liquid temperature in the beverage provided in a suitable decanter or the like.

Cabinet 13 further defines a hollow upright portion 18 extending upwardly from a rear portion 19 of a base 20. The upright portion 18 supports at its upper end the rear portion of the head whereby the head is effectively supported in cantilevered fashion from the base through the upright portion 18, as seen in FIG. 1.

The present invention is concerned with means for alternatively delivering cold water to the basin 16 from a pressurized source, such as a city main. For this purpose, the brewer is provided with a control valve 21 having an inlet connection 22 for connecting a water supply line thereto at the rear of the upright support portion 18 of the cabinet. Connected to the valve 21 is a flow regulator 23 which, in turn, is connected to a duct 24 to a gooseneck 25 opening into the basin 16 at the rear portion thereof subjacent the warmer 17.

Delivery of cold water to the basin through valve 21 is controlled by a timer 26. The valve 21 and timer 26 are mounted in the hollow rear support portion 18 by means of a mounting member 27, as best seen in FIG. 3.

The mounting member, as shown in FIG. 2, includes an upper flange 28 abutting the forward wall 29 of the upright portion 18 of cabinet 13. The mounting member further includes an upright mounting wall portion 30 having an upper end 31 spaced forwardly from the lower end 32 of the flange 28 by a horizontally extending spacer portion 33.

A base wall portion 34 of the mounting member extends horizontally rearwardly from a lower portion 35 of the mounting wall portion 30 and is provided at its rear end portion 36 with a downturned flange 37. The opposite sides of the base wall 34 are provided with similar downturned flanges 38.

As shown in FIG. 3, upright portion 18 of the cabinet 13 defines a pair of inturned vertical flanges 39. The opposite ends of flange 37 are secured to the rear surface of the flanges 39 by suitable securing means, such as welds 40. As further seen in FIG. 3, the upper flange 28 of the mounting member is secured to the forward wall 29 of the upright portion 18 of cabinet 13 by suitable means, such as welds 41. Welds 41 effectively define means for securing the flange to the cabinet wall extending only rearwardly from the cabinet wall.

Timer 26 may be secured to the mounting wall portion 30 by suitable securing means, such as threaded securing means 42 extending through suitable flanges 43 on the timer and the mounting wall portion 30 to be received forwardly of the mounting wall portion and rearwardly of the cabinet wall portion 29. As shown in FIG. 4, the mounting wall portion 30 may be provided with a pair of openings 44 for passing the threaded securing means 42 therethrough. The base portion 34 of the mounting member may be provided with suitable openings 45 for receiving suitable securing means 46 for securing the valve 21 to the base wall 34.

The base wall may be further provided with a suitable opening 47 provided with an annular guide member 48 for guiding wires 49 upwardly through the base wall 44 for connection selectively to the valve 21 and timer 43 which, in the illustrated embodiment, comprise electrically operated devices.

Thus, the mounting member 27 is secured at its upper end to the forward wall 29 of the upright portion 18 of cabinet 13 and at its lower end, to the inturned side flanges thereof. The timer 26 and flow control valve 21 may be removably secured to the mounting member with the threaded securing means being readily accessible for facilitated removal and replacement of the timer and valve, as in the servicing of the brewer.

The mounting member further serves to rigidify the support 18. The top flange 28 is spaced below head 12 and the bottom flange 37 is spaced above the base 20 of the cabinet 13 so that the midportion of upright portion 18 of the cabinet is rigidified in a novel and simple manner by the mounting member.

As indicated above, the mounting member may be fabricated by simple forming from a metal sheet with the openings 44 and 47 being provided concurrently with the forming operation.

Thus, the beverage brewer structure of the present invention is extremely simple and economical of construction while yet providing the improved facilitated servicing functioning discussed above.

The foregoing disclosure of specific embodiments is illustrative of the broad inventive concepts comprehended by the invention.

I claim:

1. In a beverage brewer having a cabinet having a hollow rear upright portion carried on a base and supporting an upper brewing head, said upright portion defining a forward vertical wall and vertically extending inturned spaced rear flanges and being formed of sheet metal, an electrically operable valve for controlling flow of pressurized water to the brewing head, an electrically operable timer for controlling the operation of the valve to provide a preselected quantity of brewing water during a brewing operation, and electrical wires for providing electrical current to the valve and timer, the improvement comprising:

a one-piece mounting member disposed within said cabinet upright portion, said mounting member defining an upper flange abutting said forward wall of the upright portion, an upright mounting wall wall portion, a spacer mounting an upper end of said mounting wall portion to said flange for spacing said mounting wall portion rearwardly of said upright portion forward wall, a horizontal lower base wall at the lower end of said mounting wall, and a lower horizontal flange turned vertically from the rear end of said base wall;

means securing said upper flange to said forward wall of the upright portion;

means securing said lower flange at its opposite ends to said inturned flanges of said upright portion whereby said mounting member reinforces said formed sheet metal upright portion of the cabinet;

means securing said valve to said base; and means securing said timer to said mounting wall portion.

2. The beverage brewer of claim 1 wherein said means securing said upper flange to said forward wall extends solely rearwardly of said formed wall.

3. The beverage brewer of claim 1 wherein said means securing said timer to said mounting wall portion extends to forwardly of said mounting wall portion.

4. The beverage brewer of claim 1 wherein said means guiding said electrical wires comprises an annular member mounted in an opening in said base wall rearwardly of said means securing said valve to said base wall.

5. The beverage brewer of claim 1 further including downturned flanges at the opposite sides of said base wall.

6. The beverage brewer of claim 1 further including a fluid flow regulator carried by said valve to be spaced adjacent to said base.

7. The beverage brewer of claim 1 wherein said cabinet further defines a pour-in opening overlying said rear support, a basin having a portion underlying said opening to receive cold brewing water poured therethrough, and conduit means extending upwardly rearwardly of said mounting member and having an upper end defining a gooseneck extending into said basin for selectively delivering pressurized cold brewing water thereto.

8. The beverage brewer of claim 1 wherein said mounting member is spaced below said brewing head and above said base.

9. The beverage brewer of claim 1 further including means for guiding said electrical wires upwardly through said base to said valve and timer.

* * * * *